United States Patent [19]

Fukuhara et al.

[11] Patent Number: 5,776,585
[45] Date of Patent: Jul. 7, 1998

[54] MOUSE PAD

[75] Inventors: Toru Fukuhara; Ken-ichi Kinoshita, both of Aichi, Japan

[73] Assignee: Narumi China Corporation, Aichi, Japan

[21] Appl. No.: 718,868

[22] Filed: Sep. 24, 1996

[30] Foreign Application Priority Data

Sep. 26, 1995 [JP] Japan .................................. 7-273597
Mar. 8, 1996 [JP] Japan .................................. 8-080823

[51] Int. Cl.$^6$ .............................. B32B 3/30; A47B 97/00
[52] U.S. Cl. .......................... 428/141; 428/152; 428/156; 428/220; 345/163; 248/346.01
[58] Field of Search ............................ 428/141, 152, 428/156, 220; 345/163; 248/346.01

[56] References Cited

U.S. PATENT DOCUMENTS 4,799,054   1/1989   House ............................... 340/710
4,833,001   5/1989   Kijima et al. ..................... 428/141
5,358,766   10/1994  Field .................................. 428/77
5,492,298   2/1996   Walker ............................ 248/346.01

FOREIGN PATENT DOCUMENTS 9301350   3/1995   Netherlands.

*Primary Examiner*—William Watkins
*Attorney, Agent, or Firm*—Oblon, Spivak, McClelland, Maier & Neustadt, P.C.

[57] ABSTRACT

A mouse pad which allows a mouse ball to rotate accompanied with the movement of a mouse accurately and prevents generation of static electricity and unpleasant frictional noise during operation of the mouse and collection of dust and fluff as well as exhibiting high impact resistance strength and flexural strength. The mouse pad for improving a controllability of the mouse as a computer input device is formed from a glass having a rugged pattern surface. An average roughness of the rugged pattern surface ranges from 2 to 20 μm, and preferably from 2 to 8 μm. It is also preferable that the glass is formed as a crystallized glass.

4 Claims, 12 Drawing Sheets $$\text{AVERAGE ROUGHNESS} = \frac{a_1 + a_2 + \cdots a_n}{n} + \left| \frac{b_1 + b_2 + \cdots b_m}{m} \right|$$

$$\text{SURFACE ROUGHNESS } (Ra) = \frac{1}{L} \int_0^L |f(x)| \, dx$$

MOUSE PAD

BACKGROUND OF THE INVENTION

1. Field of the Invention

The present invention relates to a mouse pad for improving a controllability of a mouse serving as an input device through which data are input to a computer.

2. Description of the Related Arts

Recently a mouse has been increasingly used as an effective computer input device. Referring to FIGS. 17 to 19, a mouse 5 has a mouse body 51 and a cover 57. The mouse body 51 is provided with a mouse ball 2, a holder section 55 for rotatably holding the mouse ball 2, a roller 54 provided at a side wall end of the holder section 55 and an operation surface 52 protruding from a bottom of the mouse body 51.

Each movement of the mouse ball 2 is defined by a rotational direction and a rotational speed of the rollers 54, each of which is provided in three directions to a horizontal plane. The defined movement is then converted into a corresponding electrical signal, which is transmitted to the computer via a cable 58. The mouse ball is generally spherical and formed by coating a rubber over an outer surface of the steel ball.

A mouse pad 9 has been widely used for improving the controllability of the mouse as shown in FIG. 18. The mouse pad 9 is formed from such material as a rubber, resin, reinforced glass or the like.

In case of using the mouse pad formed from either a rubber or a resin material, static electricity is generated between the mouse and the mouse pad, which causes the mouse pad to collect dust. Further the mouse pad is likely to collect tailing of a rubber eraser or a dirt. As being repeatedly used, the mouse pad surface is gradually scraped off and the resultant waste is collected by a roller part of the mouse. As the mouse pad becomes soiled due to spills, there is no practical method of cleaning it.

A mouse pad formed from a glass or a ground glass hardly causes the aforementioned problems such as static electricity nor dust collection. However this type of mouse pad tends to cause the mouse ball 2 mounted in a bottom of the mouse 5 to slip on the mouse pad 9. The slippage hinders accurate transmission of the data defined by the movement of the mouse to the computer. So the mouse pad is required to prevent the mouse ball from slipping thereon.

As FIG. 18 and FIG. 19 show, when the mouse 5 is operated on the mouse pad formed from the glass or the ground glass, the operation surface 52 protruding from the bottom of the mouse is rubbed against a control surface of the mouse pad 9, resulting in unpleasant frictional noise.

When being hit against a corner of the desk or hit with a very hard dropped object, the conventional mouse pad formed from the glass or the ground glass may be broken.

Since a mouse pad formed from the tempered glass forms a compressive stress layer on its outer surface, it withstands the bending load exerted to a relatively wider area. However substantially a large degree of distortion is retained on the tempered glass surface. When being flawed with a sharp edge of a knife or exerted with a great force momentarily, such glass pad formed from the tempered glass is likely to be smashed to pieces more heavily compared with that formed from a conventional glass material.

When using the mouse on the tempered glass mouse pad, a disturbing noise may be generated owing to friction between the operation surface of the mouse body and the mouse pad. This kind of noise sounds unnecessarily louder in a quiet environment where the computer is used, which may disturb the computer user from concentrating on the logical thought.

SUMMARY OF THE INVENTION

An object of the present invention is to provide a mouse pad which aids the mouse ball to accurately rotate accompanied with each movement of the mouse, inhibits generation of static electricity, disturbing frictional noise while operating the mouse and dust collection as well as exhibiting excellent impact resistance strength and flexural strength.

The present invention provides a mouse pad for improving a controllability of a mouse for inputting data to a computer. The mouse pad is formed from a glass with a rugged pattern surface having an average roughness ranging from 2 to 20 μm.

DETAILED DESCRIPTION OF THE INVENTION

Figures 1A, 1B, 1C:
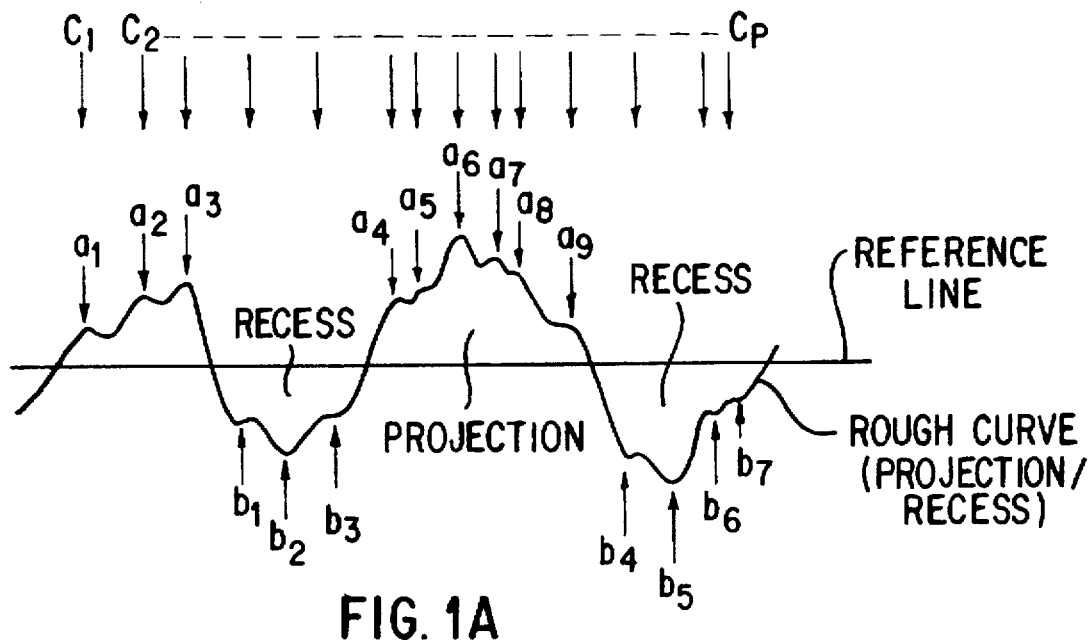
FIG. 1 is a graphical representation of a rugged pattern surface of a mouse pad of the present invention and equations for obtaining an average roughness and surface roughness of the mouse pad surface (Ra).

As FIG. 1 shows, an average roughness of a rugged pattern surface of a mouse pad represents a difference between the average height of projections and the average height of recesses of the rugged pattern formed on the surface of a crystallized glass (glass-ceramics). More specifically the average roughness is obtained by adding the average height from the peaks of projections to the reference line (a1, a2, ... an) to the average height from the peaks of recesses to the reference line (b1, b2, ... bn) as FIG. 1(a) shows.

The above equation is shown in FIG. 1(b). The reference line across the above-described rugged pattern is so set that sum of squares of deviations ranging from the reference line to the rough curve (rugged pattern) becomes minimum.

If the average roughness of the rugged pattern is less than 2 μm, the mouse ball slips on the mouse pad, failing to rotate accompanied with the movement of the mouse. The frictional force between the operation surface of the mouse and the rugged pattern surface of the mouse pad may become large, preventing the mouse from moving smoothly. While if the average roughness exceeds 20 μm, the mouse ball also slips, failing to rotate accompanied with the movement of the mouse. The mouse pad is rubbed against the protrusion part provided in the bottom of the mouse, resulting in unpleasant frictional noise.

An advantageous effect of the present invention is hereinafter described.

The mouse pad has a rugged pattern surface (average roughness:2 to 20 μm). When the mouse ball is operated on this type of mouse pad, a frictional force generated therebetween serves to prevent the mouse ball from slipping.

Therefore the mouse ball accurately rotates accompanied with the movement of the mouse so that the information obtained through the mouse movement is correctly transmitted to the computer.

Even if the operation surface on the bottom of the mouse is rubbed against the rugged pattern surface of the mouse pad, no unpleasant frictional noise is generated.

Therefore the mouse pad of the present invention improves the controllability of the mouse.

The static electricity generated between the operation surface of the mouse and the mouse ball is substantially weak and hardly collects the dust and fluff on the mouse pad surface.

Since the mouse pad is formed from a hard crystallized glass, its surface is not scraped off through operation of the mouse thereon.

In case of some spills on the mouse pad, the mouse pad is not permeable to such liquid. So it can be washed away.

Since the mouse pad is formed from the hard crystallized glass, a slight degree of static electricity is generated owing to friction between the mouse pad surface and the protrusion part of the mouse. The static electricity is so weak that the mouse pad hardly collects dust or fluff and the stain, if any, can be easily removed by wiping off or washing the mouse pad.

It is preferable that the average roughness of the rugged pattern of the glass surface ranges from 2 to 8 μm in order to transmit the movement of the mouse to the mouse ball more accurately. Therefore the frictional noise caused by rubbing between the mouse pad surface and the operation surface of the mouse is never generated.

It is preferable that the above-described glass is formed from a crystallized glass in order to improve the strength of the mouse pad as a whole. The bending strength is especially improved and it can be further readily manipulated.

A conventional glass such as a transparent glass or a ground glass has a Vickers hardness of 540 kgf/mm² as shown in Table 1. While a crystallized glass has a Vickers hardness of 740 kgf/mm². The Vickers hardness of the tempered glass is not available because a Vickers penetrator formed from diamond is supposed to break the tempered glass to pieces when being inserted thereinto. This implies that a conventional tempered glass will be broken to pieces in case it is flawed with a sharp edge of a knife. Conventional transparent glass, ground glass or a tempered glass has a Mohs hardness ranging from 5 to 6. While the crystallized glass has a Mohs hardness ranging from 6 to 7.

The crystallized glass has higher values of both Vickers hardness and Mohs hardness compared with the conventional transparent glass, ground glass and the tempered glass. The crystallized glass having uniform strength both on the surface and inside serves to improve the strength of the mouse pad as a whole. The flexural strength of the crystallized glass is 1500 kgf/cm² compared with the typical glass having 500 kgf/cm², thus enhancing the strength of the mouse pad as a whole.

TABLE 1

| item | transparent glass ground glass | tempered glass | crystallized glass |
| --- | --- | --- | --- |
| bending strength | 500 kgf/cm² | 1500 kgf/cm² | 1500 kgf/cm² |
| Vickers hardness | 540 kgf/mm² | unavailable | 740 kgf/mm² |
| Mohs hardness | 5–6 | 5–6 | 6–7 |

It is preferable that the number of peaks of projections/recesses ranges from 20 to 50 per 1cm of the rugged pattern of the mouse pad surface. The number of peak is derived from counting peaks of projections/recesses, C1, C2, ... Cp, on the mouse pad surface across 1 cm of the rugged pattern surface thereof.

If there are less than 20 peaks per 1 cm of the rugged pattern surface, the friction between the operation surface of the mouse and the rugged pattern surface of the mouse pad is increased, preventing the mouse from moving smoothly. If there are more than 50 peaks per 1 cm, the mouse ball slips on the mouse pad, thus failing to transmit the data resulted from the movement of the mouse correctly to the computer. In the above status, the operation surface of the mouse is rubbed against the recess part of the mouse pad for insulation, generating unpleasant frictional noise.

In order to produce the above-described mouse pad, the melted glass-forming material is passed through rollers having rugged pattern surfaces to obtain a molding. In case the glass is formed as a crystallized glass, the resultant molding is cut into a desired shape, heat processed for crystallization and then cooled. As a result, the whole glass is crystallized.

EXAMPLES

A mouse pad of the present invention is described as well as the mouse pads formed from other materials referring to FIG. 2 to FIG. 16.

The mouse pad of the present invention serves as a pad for facilitating the controllability of the mouse through which data are input to the computer. The mouse pad is formed from a crystallized glass having a rugged pattern (projections/recesses) on the surface. The average roughness of the rugged pattern surface is 6 μm and there are 32 peaks per 1 cm of the rugged pattern.

Figure 2:
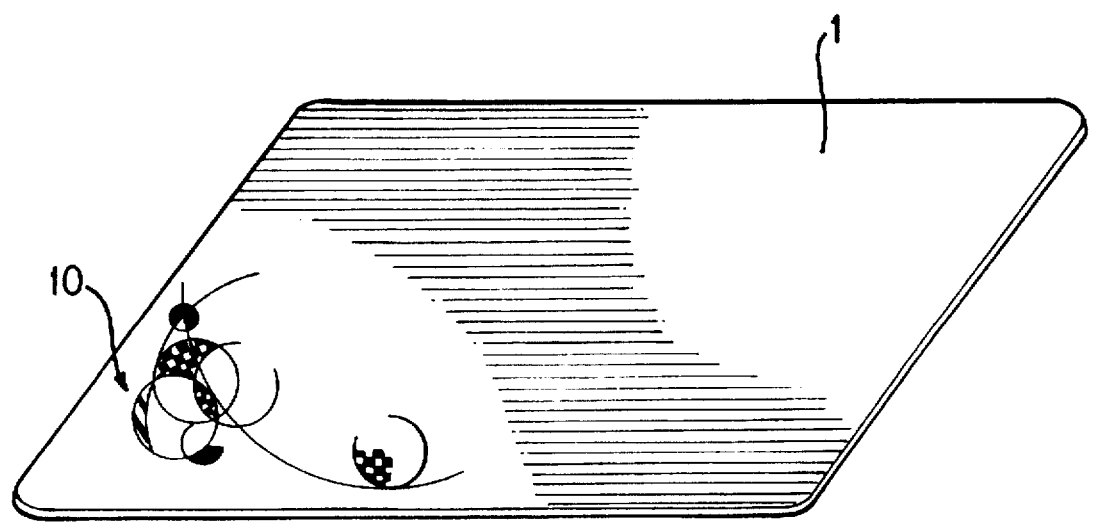
FIG. 2 is a perspective view of a mouse pad of an example.
Figure 3:
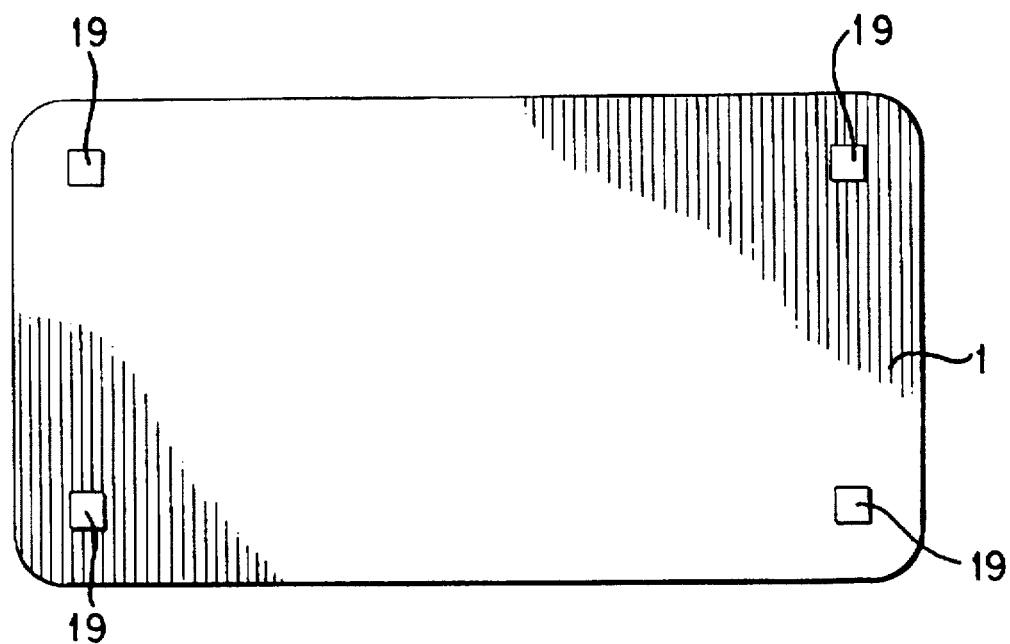
FIG. 3 is an undersurface of the mouse pad of the example.

As shown in FIG. 2, the mouse pad 1 is a square white board (19 cm×26.5 cm). A picture pattern 10 has been transferred and calcined on a surface of the mouse pad 1 just in the same manner as a decorating process to the pottery. As shown in FIG. 3, a slip-proof rubber pad 19 is adhered to each corner of the undersurface of the mouse pad 1.

A series of steps for manufacturing the mouse pad are hereinafter described. First a glass-forming material such as lithium carbonate, alumina, silicone powder or the like was melted into a molten state. Then the melted glass-forming material was passed through molding rollers having rugged pattern surfaces to obtain a molding. The resultant molding was cut into a square piece (20 cm×20 cm). The obtained molding was heated for crystallization at a temperature from 1100 °C. to 1200 °C. The temperature was gradually decreased to a room temperature so that the glass of the molding was crystallized. As a result, the mouse pad was provided. This mouse pad is hereinafter called as a sample E1.

Characteristics of the above-obtained mouse pad as the sample E1 of the present invention was evaluated in comparison with mouse pads formed from different materials as comparative samples.

Comparative samples C1, C2 and C3 are mouse pads formed from an acrylic resin, vinyl chloride and rubber, respectively. Comparative samples C4 to C9 are mouse pads formed from glasses different from that of the sample E1. Those comparative samples C1 to C3 are available on the market. Each of comparative samples C4 to C9 was manufactured with the method described below.

(Comparative sample C4)

A mouse pad as a sample C4 has a smooth surface. Therefore the C4 is different from the sample E1 having a rugged pattern surface.

The C4 was produced in the following manner. The melted glass-forming material was passed through molding rollers having smooth surfaces and formed into a molding. The molding was heat treated for crystallization. The crystallized molding was obtained as the C4. Other processes are the same as those for the sample E1.

(Comparative sample C5)

The glass part of a mouse pad as a C5 has not been crystallized. The C5 is different from the E1 which has been formed from a crystallized glass.

The mouse pad as the C5 used the same glass-forming material as the E1. The same molding rollers having rugged pattern surfaces used for molding the E1 was also used for obtaining a molding. The resultant molding was cut and formed as a mouse pad without crystallization. Other processes are the same as those of the sample E1.

(Comparative sample C6)

This mouse pad C6 had a smooth surface and used noncrystallized glass, which was different from the E1 formed from the crystallized glass having a rugged pattern surface.

The C6 was formed by using the same glass-forming material as the sample E1. A molding roller having a smooth surface was used for molding such material. The resultant molding was cut into a mouse pad in the same manner as the sample C5. Other processes are the same as those of the sample E1.

(Comparative sample C7)

This mouse pad as a sample C7 having a smooth surface was formed from a general type of glass material, i.e., transparent and amorphous glass.

The sample C7 mouse pad was produced through melting a glass-forming material such as sodium carbonate, potassium carbonate, calcium carbonate, magnesium carbonate, silicone powder, alumina or the like. The melted material was molded through molding rollers having smooth surfaces. The resultant molding was cooled.

(Comparative sample C8)

This mouse pad as a sample C8 having a rugged pattern surface was formed from a general type of amorphous ground glass.

The C8 mouse pad was produced by sandblasting the surface of the C7 mouse pad so that the rugged pattern was formed on the surface thereof.

(Comparative sample C9)

This mouse pad as a sample C9 having a rugged pattern surface was formed from a tempered glass. The mouse pad C9 was produced by blasting to have the rugged pattern on the surface and etching with hydrofluoric acid. The obtained mouse pad was air blast cooled. As a result, compressive strain was generated on the whole surface of the mouse pad, resulting in the surface reinforcement.

(Experiment 1)

Each controllability of a mouse operated on each of the mouse pads as the sample E1 and comparative samples C1 to C9 was evaluated. The controllability of the mouse was defined by values of each frictional force generated between the mouse ball and the mouse pad and between the operation surface of the mouse body (except the mouse ball) and the mouse pad.

As the frictional force between the mouse ball and the mouse pad becomes larger, the mouse ball is enabled to rotate accompanied with the movement of the mouse more closely without slipping on the mouse pad.

As the frictional force between the operation surface of the mouse body and the mouse pad becomes larger, it becomes more difficult to control the mouse.

Therefore good controllability of the mouse is assumed to be obtained under such condition that the frictional force between the mouse ball and the mouse pad is large and the frictional force between the operation surface of the mouse body and the mouse pad is small.

Based on the above-described assumption, each frictional force between the mouse ball and the mouse pad and the operation surface of the mouse body and the mouse pad was measured with the following method.

Figure 4:
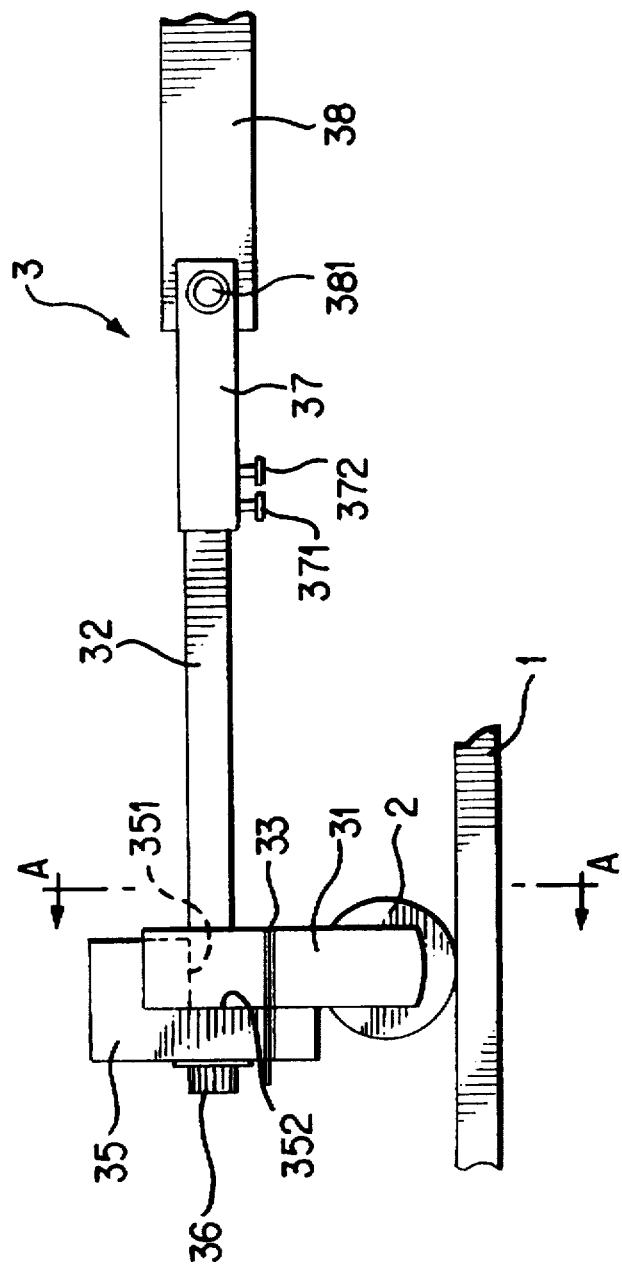
FIG. 4 is a cross-sectional view of a device for measuring a frictional force between a mouse pad surface and a mouse ball in the example.
Figure 5:
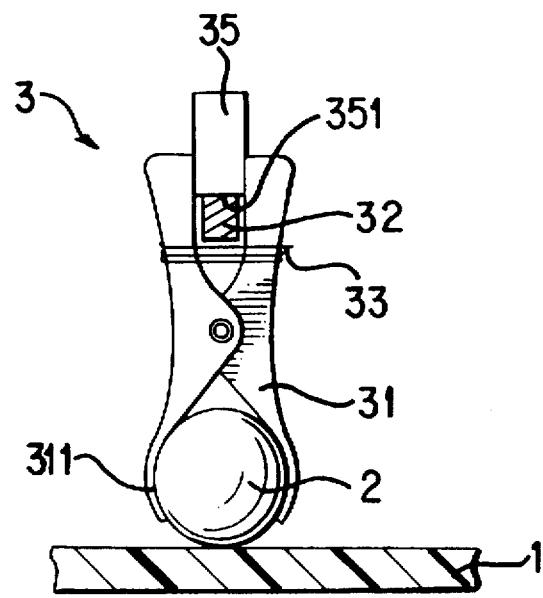
FIG. 5 is a cross-sectional view taken on line A—A of FIG. 4.
Figure 6:
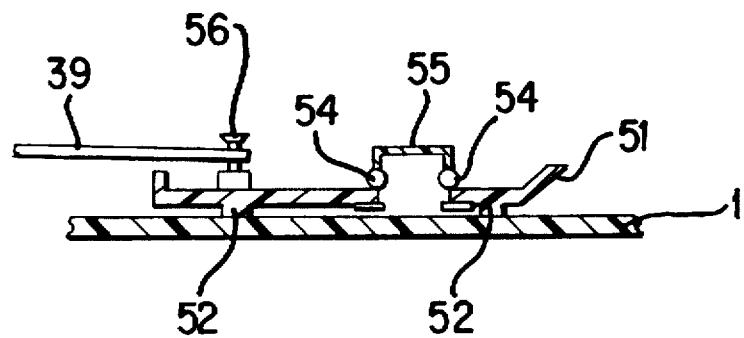
FIG. 6 is an explanatory view showing how the frictional force between the mouse pad and an operation surface of the mouse is measured in the example.

The method for measuring the frictional force between the mouse ball and the mouse pad is hereinafter described. As FIG. 4 and FIG. 5 show, a frictional force measurement equipment 3 was used for such measurements. The frictional force measurement equipment 3 has a clip 31 interposing and fixing a mouse ball 2, a support rod 32 inserted into a space above the clip 31 and a holder 35 for fixing the support rod 32 to the clip 31.

The support rod 32 was fixed to the clip 31 with its upper surface in contact with an undersurface 351 of the holder 35 and its end in a longitudinal direction in contact with a side surface 352 of the holder 35. The other end of the support rod 32 in the longitudinal direction is connected to jigs 37 an 38 for fixation provided with a stress sensor. In FIG. 4 and FIG. 5, a reference numeral 33 denotes a wire for reinforcing to hold the clip. Reference numerals 36, 371, 372 and 381 denote screws for fixation.

For measuring the frictional force between the mouse ball 2 and the mouse pad 1, the mouse ball 2 was held between the clips 31 of the frictional force measurement equipment 3. Then the frictional force measurement equipment 3 was placed on the mouse pad 1, keeping the mouse ball 2 fixed. The mouse pad 1 was then rotated so that the frictional force between the mouse ball 2 and the mouse pad 1 was measured. The frictional force was defined by a tensile strength (g) exerted to the frictional force measurement equipment during rotation of the mouse pad. The mouse ball weighed 38 g and the frictional force measurement equipment except the stress sensor weighed 30 g, resulting in total weight of 68 g.

For measuring the frictional force between the operation surface of the mouse body and the mouse pad, only the mouse body 51 (excluding the cover and the mouse ball) was used. A fixation screw 56 for the mouse body 51 was fixed to a jig 39 formed from a stainless steel wire.

A weight (300 g) was placed on the mouse body 51 (38 g), so the total weight was 338 g. The weight served as a load which was assumed to be exerted to the mouse body when being grasped and operated by one hand of the user. The weight and the mouse body 51 were placed on the mouse pad 1. The mouse pad 1 was rotated with the mouse body 51 and the weight kept fixed to the jig 39. The frictional force between the operation surface 52 of the mouse body 51 and the mouse pad 1 was measured.

Each controllability of the mouse operated on the respective mouse pads, E1 and comparative samples C1 to C9 was evaluated through the above measurement method. It was also measured whether or not any frictional noise was generated when operating the mouse on the respective mouse pads. The measurement results are shown in Table 2.

As shown in Table 2, the frictional force between the mouse pad E1 and the mouse ball resulted in 63.7 g, relatively larger than those values of mouse pads C1, C2 and C3.

While the frictional force between the mouse pad E1 and the operation surface of the mouse body resulted in a small value. The mouse ball rotated accompanied with the mouse movement accurately without slipping on the mouse pad. Therefore data resulted from the movement of the mouse was accurately transmitted to the computer. Even though the operation surface of the bottom of the mouse was rubbed against the rugged pattern of the mouse pad surface, no unpleasant frictional noise was generated.

However, the sample E1 resulted in higher controllability of the mouse than the sample C5.

Both frictional forced between the mouse ball and the glass mouse pad having smooth surface (samples C4, C6 and C7) and between the mouse body and the glass mouse pad having smooth surface (samples C4, C6 and C7) resulted in large frictional forces and low controllability of the mouse.

The frictional force between the mouse ball and the ground glass mouse pad (sample C8) having a rugged pattern surface resulted in a small frictional force as well as a large degree of slippage of the mouse ball.

When operating the mouse on the mouse pad formed from the tempered glass (C9), the frictional noise was generated.

(Experiment 2)

The experiment 2 was executed to measure static electricity generated on the mouse pad.

First a nylon fabric (towel) was used to rub the mouse pad surface 5 times very hard with repetition so that the voltage generated by rubbing was immediately measured. This measurement was repeated 3 times. The voltage was measured with a potential measurement device (type KS-325). The measurement was executed at 27° C. to 28° C. and humidity of 60%. The measurement results are shown in Table 3.

As shown in Table 3, the mouse pad E1 of the present invention hardly generated static electricity. While those mouse pads C1, C2 and C3 generated the static electricity. This shows that the mouse pad of the present invention hardly generates the static electricity, thus preventing collection of dust and fluff.

TABLE 2

(Evaluation on controllability of mouse)

| | | | frictional force | | | |
|---|---|---|---|---|---|---|
| Sample | material | surface | mouse ball only (g) | mouse body (g) | controllability of mouse | frictional noise |
| E 1 | crystallized glass | projection/recess | 63.7 | 57.5 | Mouse movement was smooth. Mouse ball did not slip. | none |
| C 1 | acrylic resin | projection/recess | 45.5 | 45.5 | Mouse ball slipped. | none |
| C 2 | vinyl chloride | projection/recess | 47.6 | 59.9 | Mouse ball slipped. | slightly audible |
| C 3 | rubber | projection/recess | 52.5 | 57.5 | Mouse ball slipped. | none |
| C 4 | crystallized glass | smooth | 66.9 | 79.8 | Mouse movement was not in good control. | none |
| C 5 | glass before crystallization | projection/recess | 70.7 | 62.9 | Mouse movement was smooth. Mouse ball did not slip. | none |
| C 6 | glass before crystallization | smooth | 73.8 | 92.3 | Mouse movement was not in good control. | none |
| C 7 | conventional glass | smooth | 68.3 | 105.3 | Mouse movement was not in good control. | none |
| C 8 | conventional ground glass | projection/recess | 42.9 | 63.8 | Mouse ball slipped. | audible |
| C 9 | tempered glass | projection/recess | 61.2 | 57.9 | Mouse movement was smooth. Mouse ball did not slip. | audible |

This shows that the mouse pad of the present invention improves the controllability of the mouse.

Each frictional force between the mouse ball and the mouse pads (C1 : acrylic resin, C2 : vinyl chloride and C3 : rubber) resulted in a relatively small value compared with that of the mouse pad (E1) of the present invention. The mouse ball was slipped on those mouse pads C1, C2 and C3. When operating the mouse on the mouse pad C2, a slight degree of the frictional noise was generated.

Being operated on the mouse pad made of noncrystallized glass (C5), the mouse showed good controllability.

(Experiment 3)

Each degree of the frictional noise when using the mouse on the respective mouse pads was measured.

The mouse was operated in a usual manner on each of the mouse pads, E1 and C1 to C9. Then the frictional noise generated during the operation was measured by using a noise meter (SM-7, produced by ONKYO SOKKI KABUSHIKIKAISHA). Referring to Table 4, a resultant frictional noise value less than 60 dB was marked as ◯, the value ranging from 60 to 66 dB was marked as Δ and the value exceeding 66 dB was marked as X.

In Table 4, the mouse pad made of crystallized glass (E1) generated the low frictional noise less than 60 dB. On the contrary, the mouse pads made of a general ground glass (C8) and a tempered glass (C9) generated relatively higher frictional noise exceeding 66 dB.

This shows that the mouse pad of the present invention generates low frictional noise, which is suitable for being used in a quiet environment.

TABLE 3

(generation of static electricity)

| Sample | E1 | C1 | C2 | C3 |
| --- | --- | --- | --- | --- |
| material | crystallized glass | acrylic resin | vinyl chloride | rubber |
| texture | hard | relatively hard | relatively hard | soft |
| first | +0.5 kv | −2 kv | −4 kv | +3 kv |
| second | +0.5 kv > | −2 kv | −5 kv | +3 kv |
| third | +0.5 kv > | −1 kv | −3 kv | +2 kv |

TABLE 4

(mesurement of the frictional noise caused by a mouse pad)

| sample | material | frictional noise (dB) | judgment |
| --- | --- | --- | --- |
| E1 | crystallized glass | 56–59 | ○ |
| C1 | acrylic resin | 63–66 | Δ |
| C2 | vinyl chloride | 61–63 | Δ |
| C3 | rubber | 49–53 | ○ |
| C4 | crystallized glass | 48–51 | ○ |
| C5 | glass before crystallization | 56–59 | ○ |
| C6 | glass before crystallization | 48–51 | ○ |
| C7 | conventional glass | 45–48 | ○ |
| C8 | conventional ground glass | 66–69 | X |
| C9 | tempered glass | 69–72 | X |

(Experiment 4)

In this experiment, each surface condition of the respective mouse pads was observed.

Each surface condition of those mouse pads, E1, C1, C2, C3, C4, C5, C6, C7, c8 and C9 is shown in FIGS. 7, 8, 9, 10, 11, 12, 13, 14, 15 and 16, respectively. The same magnifications both in a planar direction and a vertical direction of the mouse pad were used in FIG. 7, FIGS. 11 to 16. Magnifications in a vertical direction of FIGS. 8 to 10 was decreased to be lower than those of FIGS. 7 and 11 to 16.

The resultant surface condition of the respective mouse pads was hereinafter described.

Figure 7:
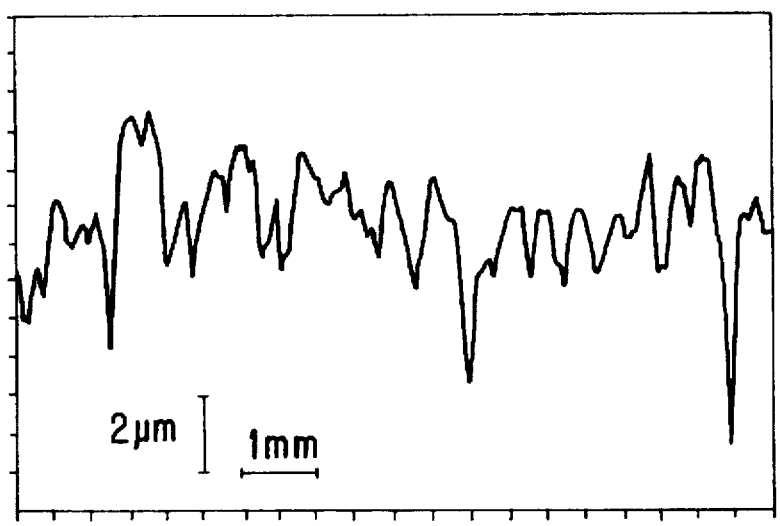
FIG. 7 is a graphical representation of a surface condition of a mouse pad of a sample E1.

As FIG. 7 shows, the mouse pad E1 has a rugged pattern surface, and especially, rounded peaks of those projections and recesses.

Figure 8:
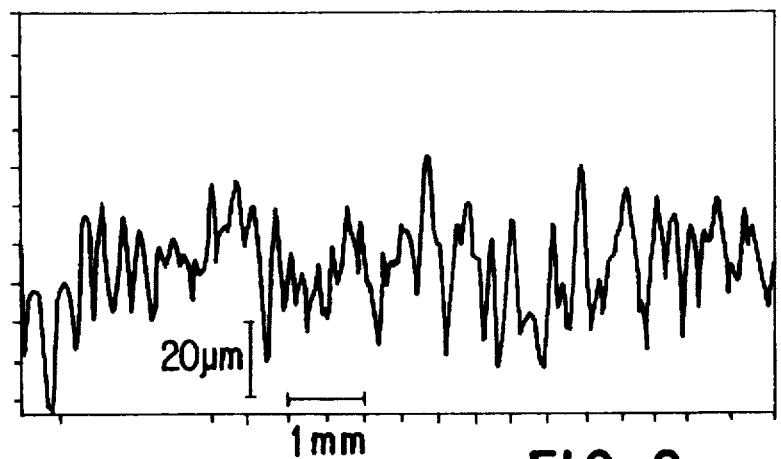
FIG. 8 is a graphical representation of a surface condition of a mouse pad of a sample C1.

The mouse pad C1 observed to have a smooth surface when seen by naked eyes. However, as shown in FIG. 8, magnified surface exhibits projections and recesses.

Figure 9:
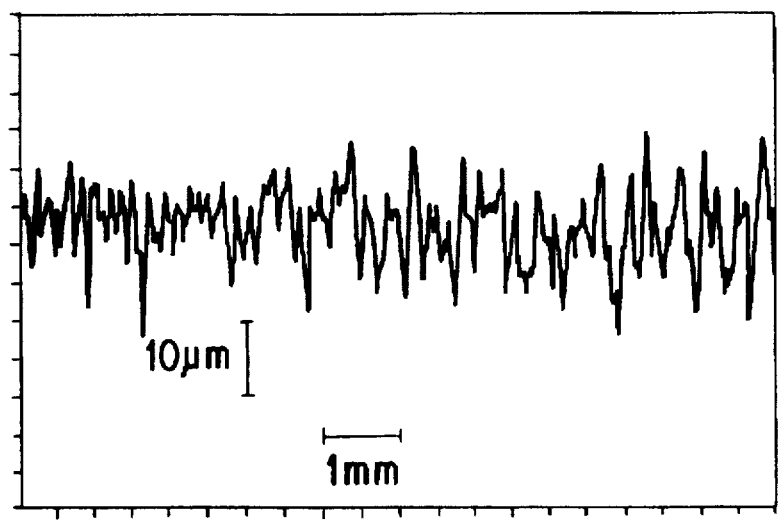
FIG. 9 is a graphical representation of a surface condition of a mouse pad as a sample C2.

The mouse pad C2 observed a rugged surface having projections and recesses as shown in FIG. 9.

Figure 10:
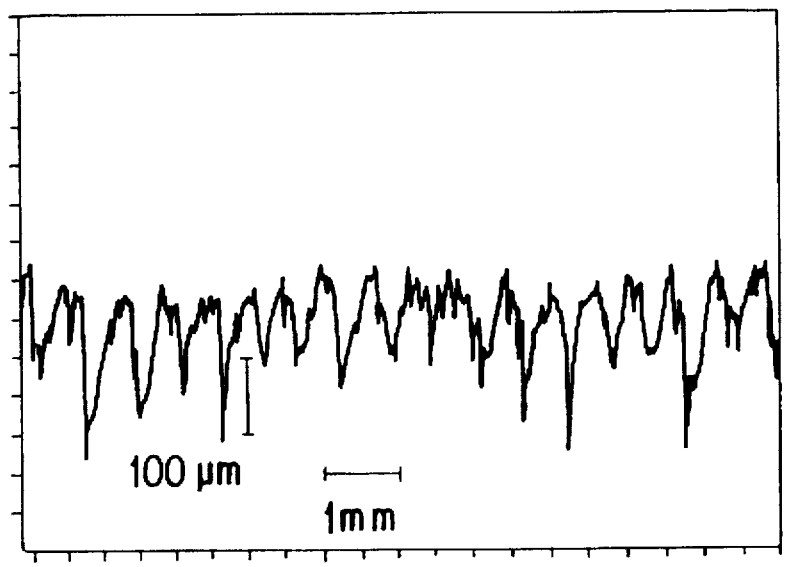
FIG. 10 is a graphical representation of a surface condition of a mouse pad as a sample C3.

The mouse pad C3 observed a smooth surface in spite of an amplitude of the ruggedness as shown in FIG. 10.

Figure 11:
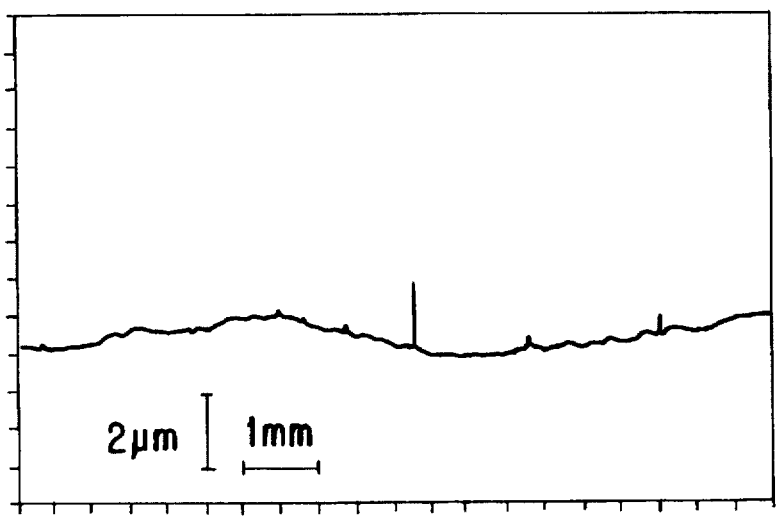
FIG. 11 is a graphical representation of a surface condition of a mouse pad as a sample C4.

The mouse pad C4 observed a smooth surface as shown in FIG. 11.

Figure 12:
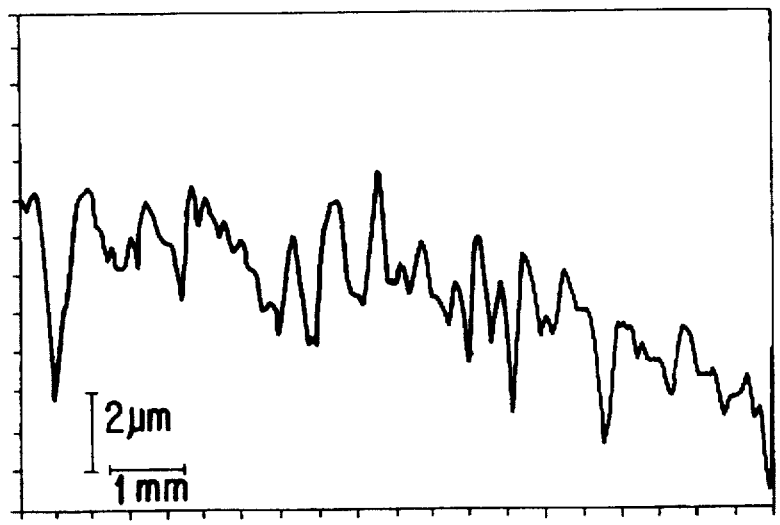
FIG. 12 is a graphical representation of a surface condition of a mouse pad as a sample C5.

The mouse pad C5 observed a uniform rugged pattern shown in FIG. 12, which is similar to the E1.

Figure 13:
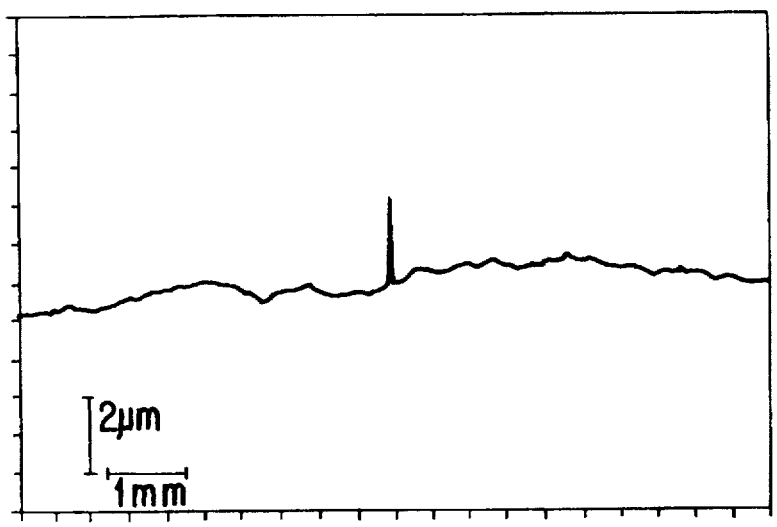
FIG. 13 is a graphical representation of a surface condition of a mouse pad as a sample C6.
Figure 14:
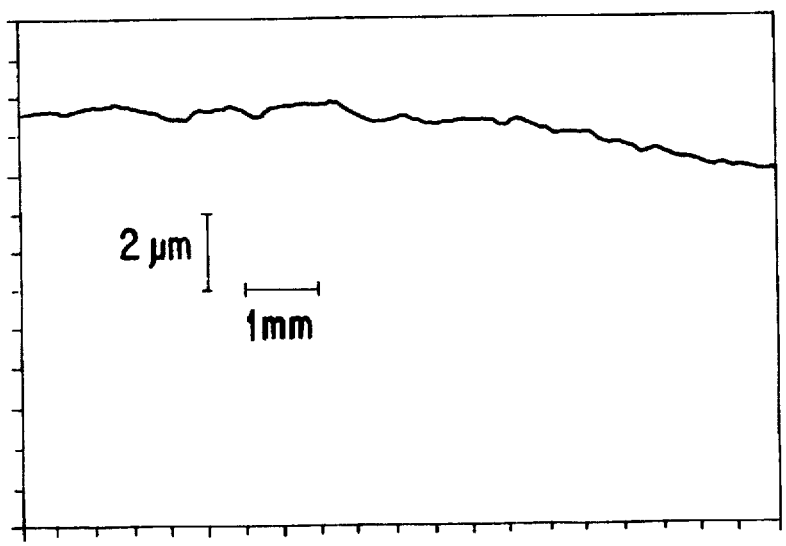
FIG. 14 is a graphical representation of a surface condition of a mouse pad as a sample C7.

The mouse pad C6 observed a smooth surface as shown in FIG. 13.

The mouse pad C7 observed a smooth surface as shown in FIG. 13.

Figure 15:
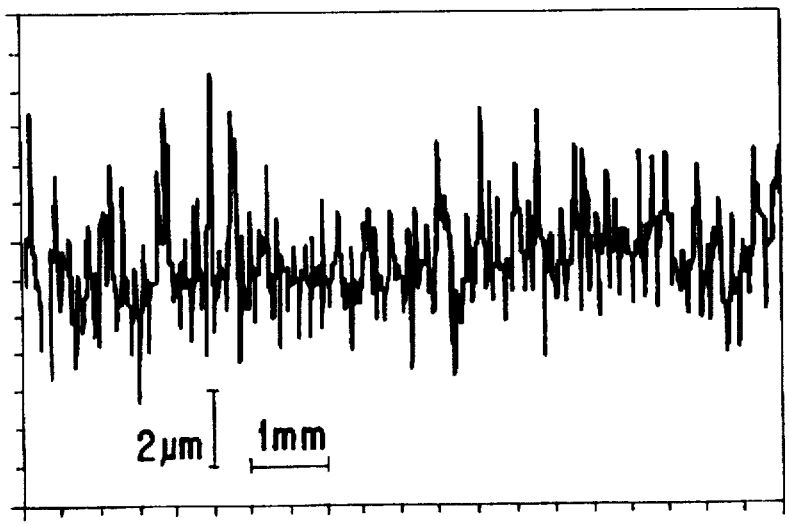
FIG. 15 is a graphical representation of a surface condition of a mouse pad as a sample C8

The mouse pad C8 shown in FIG. 15 observed a sharp rugged pattern exhibiting more peaks of projections/recesses than those of the E1.

Figure 16:
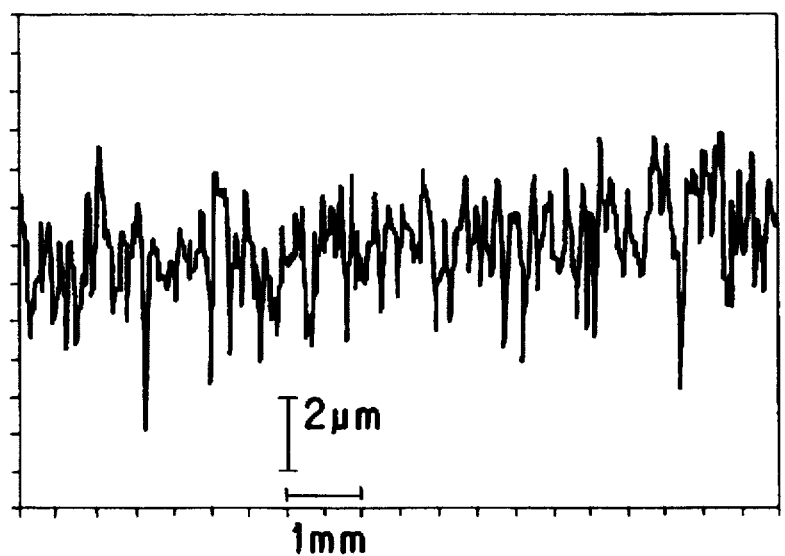
FIG. 16 is a graphical representation of a surface condition of a mouse pad as a sample C9.
Figure 17:
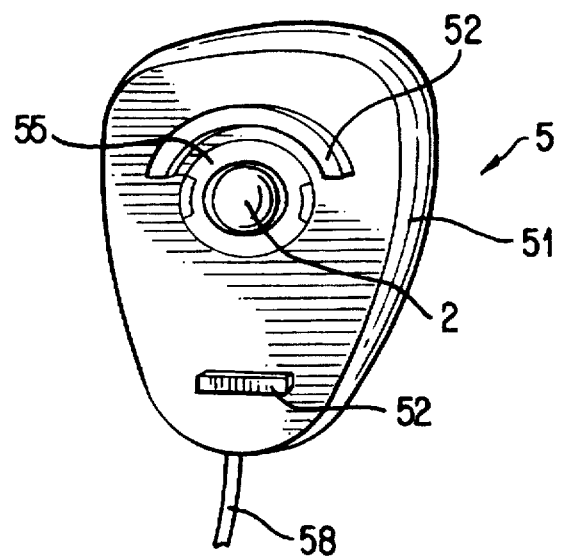
FIG. 17 is a perspective view of an undersurface of a conventional mouse.
Figure 18:
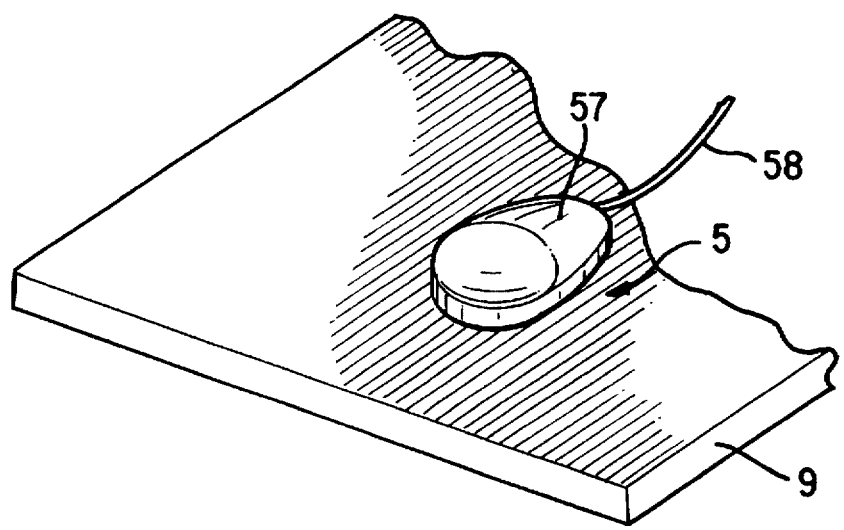
FIG. 18 is a schematic view showing how the mouse is operated on the mouse pad as a prior art.
Figure 19:
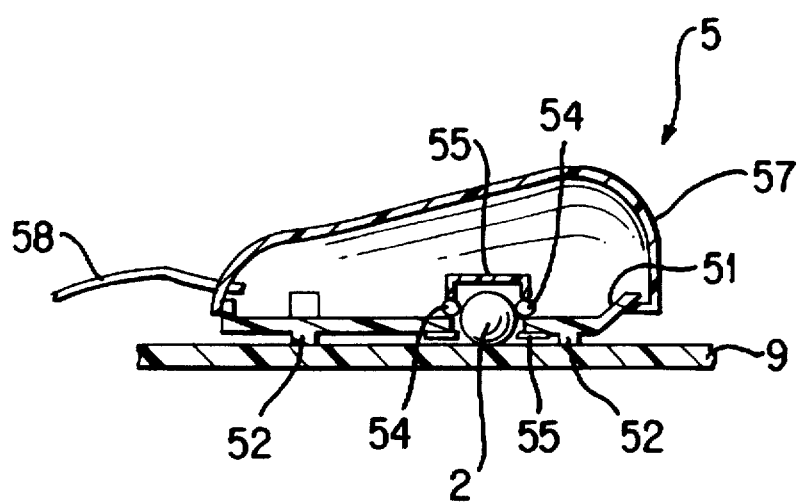
FIG. 19 is a sectional view of the mouse pad and the mouse thereon as a prior art.

The mouse pad C9 shown in FIG. 16 also observed a sharp rugged pattern exhibiting more peaks of projections/recesses than those of the E1.

As the above measurement results show, both mouse pads E1 and Cs had loose rugged patterns compared with those of C8 and C9. The glass mouse pads such as E1, C4 to C9 observed relatively smooth surfaces compared with those mouse pads made of materials other than the glass such as C1, C2 and C3.

(Experiment 5)

The surface condition, average roughness, the number of peaks of projections/recesses and surface roughness (Ra) of the respective mouse pads were measured.

Each surface condition of the mouse pads was observed by naked eyes. The average roughness and the number of peaks were obtained by the method described before.

The surface roughness (Ra) represents the average of the roughness to the reference line in conformance to JIS standard. The average of the roughness to the reference line was obtained by an equation shown in FIG. 1(c) in unit of μm. For the purpose of obtaining the above value, it is assumed that a measurement length L defined from the rough curve to the reference line is extracted and a center line of the extracted part is set as an X axis and its longitudinal direction is set as a Y axis so as to express the rough curve as y=f(x). The center line is identical to the reference line used for obtaining the average roughness.

The respective measurement results are shown in Table 5.

[surface condition]

The surface conditions of the mouse pads E1 and C3 to C7 were smooth. While the mouse pads C2 and C9 had rough surfaces and the mouse pad C8 had a sharp rugged pattern.

[average roughness]

As Table 5 shows, each average roughness of C1, C2 and C3 measured substantially high values of 36μm, 12μm and 130μm, respectively. Each average roughness of glass mouse pads E1, C5, C8 and C9 measured relatively high values ranging from 6 to 8 pm. The mouse pads C4, C6 and C7 measured low values less than 1 μm.

[number of peaks]

The mouse pad E1 had 32 peaks per 1 cm of the rugged pattern.

The mouse pads C4, C6 and C7 had less than 8 peaks per 1 cm of the rugged pattern. The mouse pad C5 had 34 peaks per 1 cm, similar to the E1. The mouse pads C1, C2, C3, C8 and C9 had relatively large amounts of peaks i.e., 63 or more peaks per 1 cm.

[surface roughness]

Each surface roughness (Ra) of the rugged pattern of the E1 and C5 was 0.62 μm and 0.65 μm, respectively.

The mouse pads C4, C6 and C7 measured 0.09 μm or less. The mouse pads C1, C8 and C9 measured relatively large values of 0.87 μm, 1.00 μm and 0.89 μm, respectively compared with the sample E1. The mouse pads C2 and C3 measured substantially large values of 3.44 μm and 31.80 μm, respectively.

Measurement results of Experiments 1 to 5 show that the mouse pad E1 has a loose rugged pattern surface exhibiting the average roughness ranging from 2 to 20 μm (Table 5), 20 to 40 peaks per 1 cm of the rugged pattern (Table 5) and projection/recess part of the rugged pattern is rounded (FIG. 7). As a result, the E1 has a superior features as shown in FIG. 2.

While on the mouse pad made of the tempered glass (C9), the mouse was smoothly operated with no slippage of the mouse ball. However unpleasant frictional noise was generated accompanied with the operation of the mouse. This is because that the surface-of the reinforced glass of the C9 has the average roughness similar to the E1 and yet has 112 peaks per 1 cm of the rugged pattern, which is three times more than that of the E1, resulting in high frictional noise.

The mouse pad of the present invention having high impact resistance strength and flexural strength allows the mouse ball to rotate accompanied with the movement of the mouse closely as well as preventing generation of static electricity, unpleasant frictional noise during operation of the mouse and collection of dust and fluff.

TABLE 5

(surface characteristics of the mouse pad)

| Sample | material | surface | surface feature | average roughness (μm) | number of peaks (peak(s)/1 cm) | surface roughness (μm) |
|---|---|---|---|---|---|---|
| E 1 | crystallized glass | projection/recess | smooth | 6 | 32 | 0.62 |
| C 1 | acrylic resin | projection/recess | smooth | 36 | 90 | 0.87 |
| C 2 | vinyl chloride | projection/recess | rough | 12 | 137 | 3.44 |
| C 3 | rubber | projection/recess | smooth | 130 | 63 | 31.80 |
| C 4 | crystallized glass | smooth | smooth | 0.8 | 8 | 0.04 |
| C 5 | glass before crystallization | projection/recess | smooth | 7 | 34 | 0.65 |
| C 6 | glass before crystallization | smooth | smooth | 0.9 | 8 | 0.09 |
| C 7 | conventional glass | smooth | smooth | 0.5 | 5 | 0.03 |
| C 8 | conventional ground glass | projection/recess | rugged | 8 | 78 | 1.00 |
| C 9 | tempered glass | projection/recess | rough | 6 | 112 | 0.89 |

A resilient material such as rubber, cork or the like is provided with each corner of the undersurface of the crystallized glass mouse pad in order to provide a slip proof effect. The undersurface of the mouse pad is coated with a resin material or various kinds of films so that the slip-proof effect can be obtained as well as the effect for preventing scatter of fragments of the broken glass.

The crystallized glass can be provided with a picture pattern thereon, thus providing an additional value in an aesthetic aspect. The picture pattern formed on the crystallized glass surface can be directly transferred or printed. Such picture pattern is calcined so as to be strongly baked on the glass surface at approximately 830° C. So the bonding strength of the picture pattern is higher than those printed on the resin mouse pad. Even when the crystallized mouse pad is broken, the picture pattern is not easily peeled off.

What is claimed is:

1. In a mouse pad for improving controllability of a mouse associated therewith for inputting data to a computer, the improvement comprising that said mouse pad is formed from a glass with 20 to 50 peaks per 1 cm of a rugged pattern surface having an average roughness ranging from 2 to 20 μm thereof.

2. The mouse pad of claim 1, wherein said average roughness of said rugged pattern surface ranges from 2 to 8 μm.

3. The mouse pad of claim 1, wherein said glass is formed as a crystallized glass.

4. The mouse pad of claim 1, wherein said rugged pattern is formed by passing melted glass-forming material through rollers.

* * * * *

UNITED STATES PATENT AND TRADEMARK OFFICE
CERTIFICATE OF CORRECTION

PATENT NO. : 5,776,585
DATED : July 7, 1998
INVENTOR(S) : Toru FUKUHARA, et al.

It is certified that error appears in the above-identified patent and that said Letters Patent is hereby corrected as shown below:

On the title page, item [75], the second inventor's name should be:

--Kenichi KINOSHITA--

Signed and Sealed this

Ninth Day of February, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,776,585
DATED : July 7, 1998
INVENTOR(S) : Toru Fukuhara, et al.

It is certified that error appears in the above-identified patent and that said Letters Patent is hereby corrected as shown below:

Column 2, delete lines 19-22, and insert –Fig. 1 is a graphical representation of a rugged pattern surface of a mouse pad of the present invention more particularly illustrated by Fig. 1(a), and Fig. 1(b) an equation for obtaining an average roughness, and Fig 1(c) an equation for obtaining surface roughness of the mouse pad surface (Ra).

Signed and Sealed this

Ninth Day of March, 1999

Attest:

Q. TODD DICKINSON

*Attesting Officer*     *Acting Commissioner of Patents and Trademarks*